(12) United States Patent
Mizutani et al.

(10) Patent No.: US 8,831,802 B2
(45) Date of Patent: Sep. 9, 2014

(54) BOAT PROPELLING SYSTEM

(75) Inventors: Makoto Mizutani, Shizuoka (JP);
Hitoshi Ishida, Shizuoka (JP)

(73) Assignee: Yamaha Hatsudoki Kabushiki Kaisha, Shizuoka (JP)

(*) Notice: Subject to any disclaimer, the term of this patent is extended or adjusted under 35 U.S.C. 154(b) by 323 days.

(21) Appl. No.: 12/832,178

(22) Filed: Jul. 8, 2010

(65) Prior Publication Data

US 2011/0010028 A1    Jan. 13, 2011

(30) Foreign Application Priority Data

Jul. 10, 2009    (JP) .................. 2009-164128

(51) Int. Cl.
| | | |
|---|---|---|
| *B60L 3/00* | (2006.01) | |
| *B60L 15/00* | (2006.01) | |
| *G05D 1/00* | (2006.01) | |
| *G05D 3/00* | (2006.01) | |
| *G06F 17/00* | (2006.01) | |
| *G05D 1/02* | (2006.01) | |
| *B63H 25/00* | (2006.01) | |
| *B63H 20/12* | (2006.01) | |
| *B63H 5/125* | (2006.01) | |

(52) U.S. Cl.
CPC .............. *G05D 1/0206* (2013.01); *B63H 20/12* (2013.01); *B63H 5/125* (2013.01); *B63H 25/00* (2013.01)
USPC .......................................... 701/21

(58) Field of Classification Search
CPC ............................. B63H 21/21; G05D 1/0206
USPC .................................... 701/20, 21
See application file for complete search history.

(56) References Cited

U.S. PATENT DOCUMENTS

| | | | | |
|---|---|---|---|---|
| 4,611,549 A | * | 9/1986 | Kodera et al. ............. | 114/144 E |
| 5,169,348 A | * | 12/1992 | Ogiwara et al. .................. | 440/1 |

(Continued)

FOREIGN PATENT DOCUMENTS

| | | |
|---|---|---|
| JP | 57-3097 U | 1/1982 |
| JP | 58-016994 A | 1/1983 |

(Continued)

OTHER PUBLICATIONS

Mizutani et al., "Boat Propelling System", U.S. Appl. No. 12/753,253, filed Apr. 2, 2010.

(Continued)

*Primary Examiner* — Behrang Badii
*Assistant Examiner* — Daniel L Greene
(74) *Attorney, Agent, or Firm* — Keating & Bennett, LLP

(57) ABSTRACT

A boat propelling system capable of determining an abnormality regarding steering of a propelling system main body includes an outboard engine main body, a steering section arranged to steer the outboard engine main body, a steering angle sensor arranged to detect a steering angle of the steering section, a pivot sensor arranged to detect an actual pivot angle of the outboard engine main body, and an ECU. The ECU calculates a target pivot angle change amount based on a target pivot angle derived from the steering angle and a baseline target pivot angle, calculates an actual pivot angle change amount based on the actual pivot angle and a baseline actual pivot angle, and obtains a gap amount between the target pivot angle change amount and the actual pivot angle change amount. Then, the ECU determines an abnormality regarding steering of the outboard engine main body based on a result of comparison between the gap amount and the first threshold value. Setting of the baseline target pivot angle and the baseline actual pivot angle is based on a result of a comparison between the gap amount and a second threshold value.

7 Claims, 20 Drawing Sheets

(56) References Cited

U.S. PATENT DOCUMENTS

| | | | |
|---|---|---|---|
| 5,884,213 A * | 3/1999 | Carlson | 701/21 |
| 6,431,928 B1 * | 8/2002 | Aarnivuo | 440/58 |
| 6,843,195 B2 * | 1/2005 | Watabe et al. | 114/144 E |
| 7,506,599 B2 * | 3/2009 | Mizutani | 114/144 R |
| 7,533,624 B2 * | 5/2009 | Mizutani | 114/144 R |
| 7,540,253 B2 * | 6/2009 | Mizutani | 114/144 RE |
| 2004/0069271 A1 | 4/2004 | Kanno et al. | |
| 2004/0162649 A1 | 8/2004 | Takada et al. | |
| 2005/0170712 A1 * | 8/2005 | Okuyama | 440/59 |
| 2006/0110990 A1 | 5/2006 | Yazaki et al. | |
| 2006/0166567 A1 | 7/2006 | Otobe et al. | |
| 2007/0068438 A1 | 3/2007 | Mizutani | |
| 2008/0115711 A1 | 5/2008 | Mizutani | |
| 2008/0269970 A1 | 10/2008 | Yamada | |
| 2009/0084299 A1 | 4/2009 | Mizutani | |
| 2010/0256845 A1 * | 10/2010 | Mizutani et al. | 701/21 |
| 2010/0292876 A1 * | 11/2010 | Mizutani et al. | 701/21 |

FOREIGN PATENT DOCUMENTS

| | | |
|---|---|---|
| JP | 06115455 A * | 4/1994 |
| JP | 2000-344191 A | 12/2000 |
| JP | 2004-249792 A | 9/2004 |
| JP | 2005-212603 A | 8/2005 |
| JP | 2005-299828 A | 10/2005 |
| JP | 2006-076413 A | 3/2006 |
| JP | 2006-150998 A | 6/2006 |
| JP | 2006-199189 A | 8/2006 |
| JP | 2006-331086 A | 12/2006 |
| JP | 2007-002934 A | 1/2007 |
| JP | 2007-091115 A | 4/2007 |
| JP | 2008-126774 A | 6/2008 |
| JP | 2008-273365 A | 11/2008 |
| JP | 2009-024700 A | 2/2009 |
| JP | 2009-083596 A | 4/2009 |
| JP | 2009-083700 A | 4/2009 |

OTHER PUBLICATIONS

Mizutani et al., "Boat Propelling System", U.S. Appl. No. 12/777,299, filed May 11, 2010.

Official Communication issued in corresponding Japanese Patent Application No. 2009-164128, mailed on Mar. 26, 2013.

* cited by examiner

F I G. 4
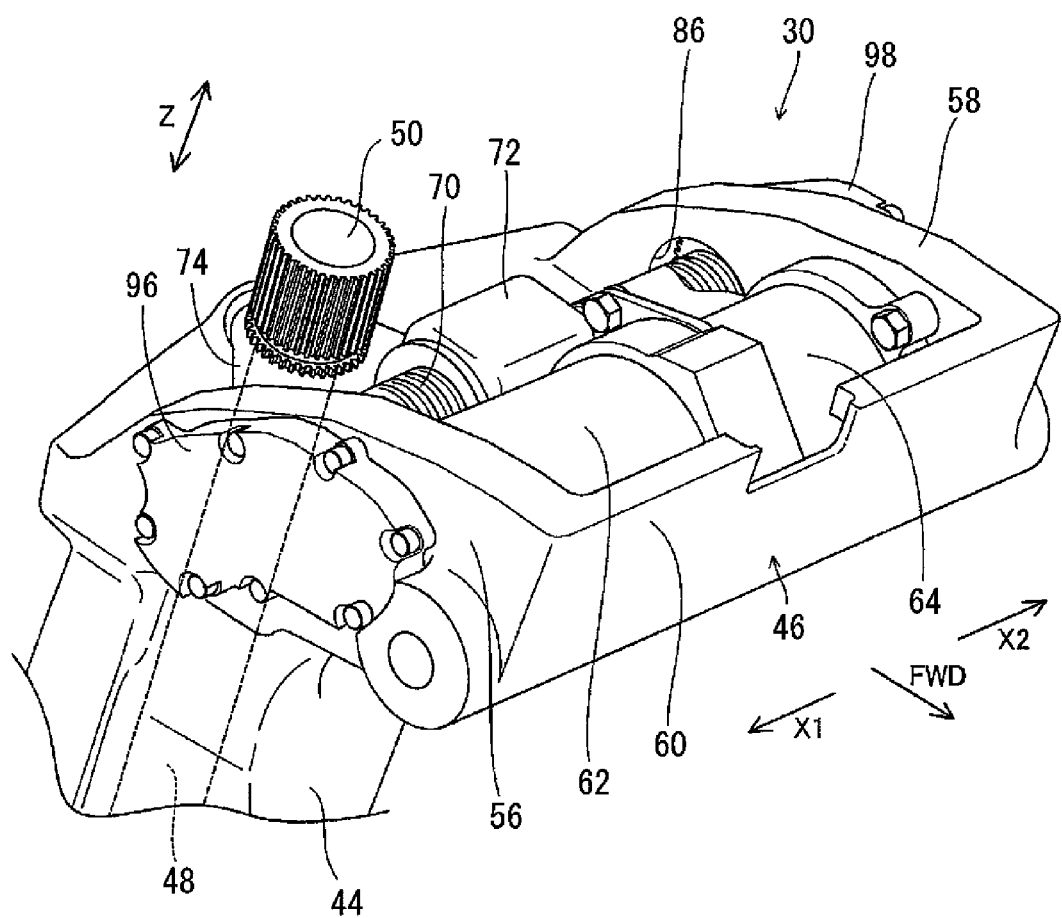

F I G. 5
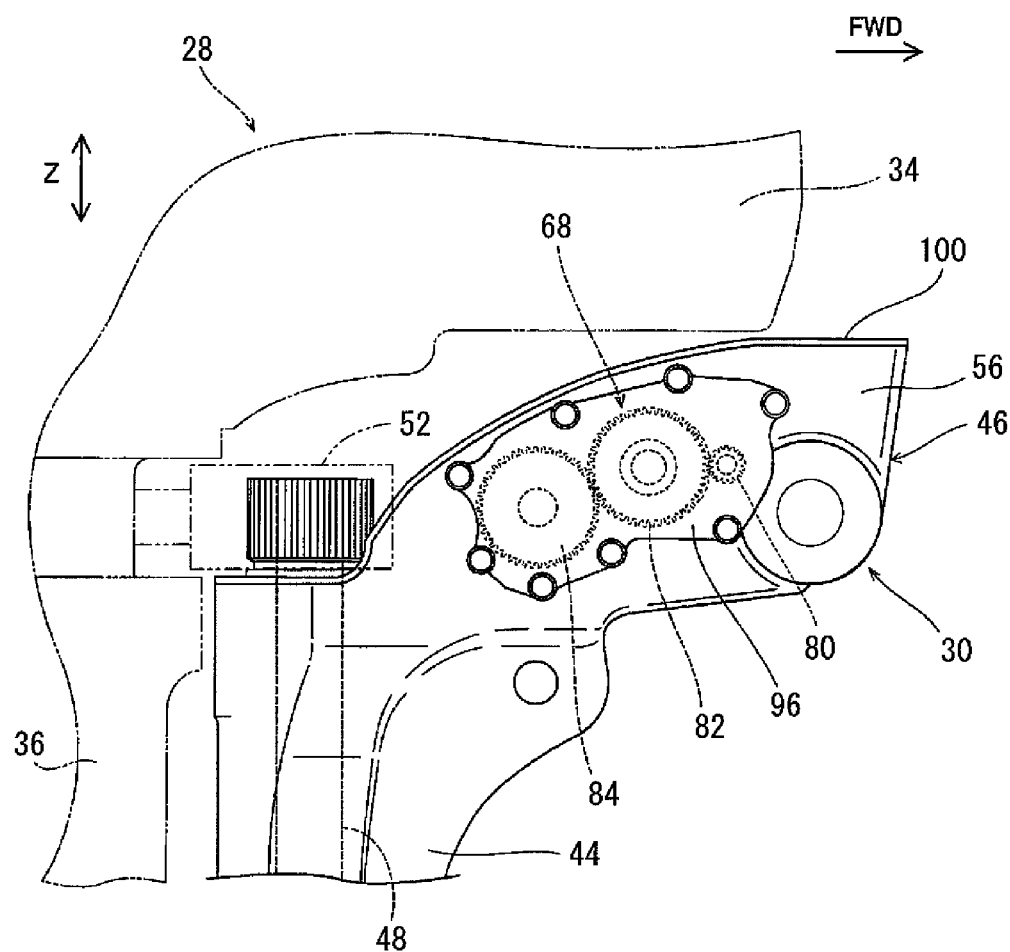

F I G. 1 1
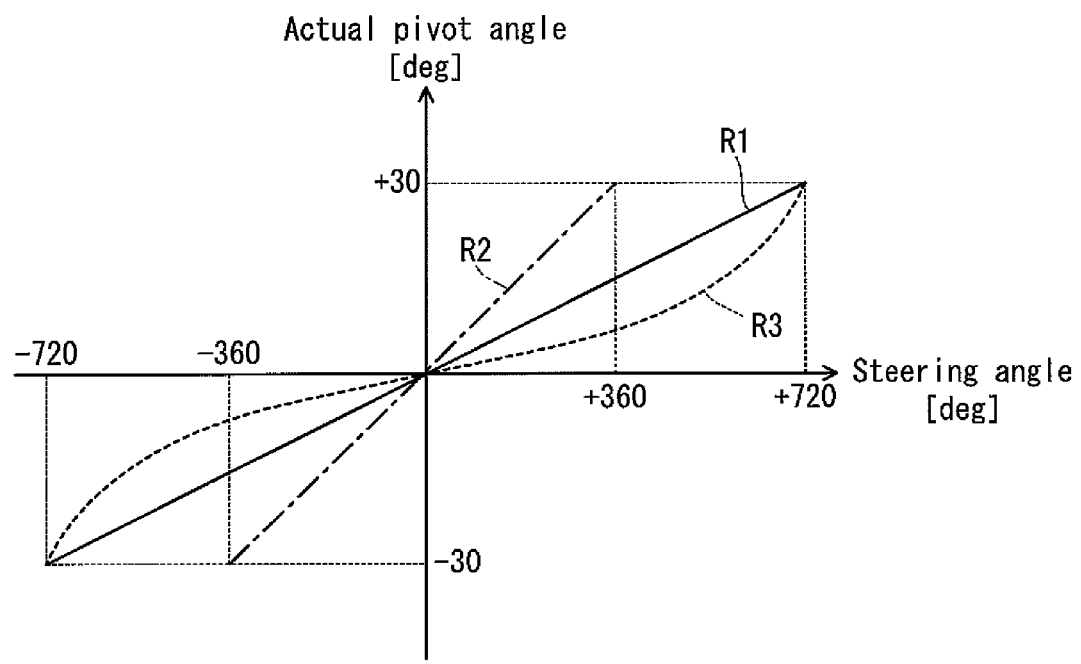

F I G. 1 2
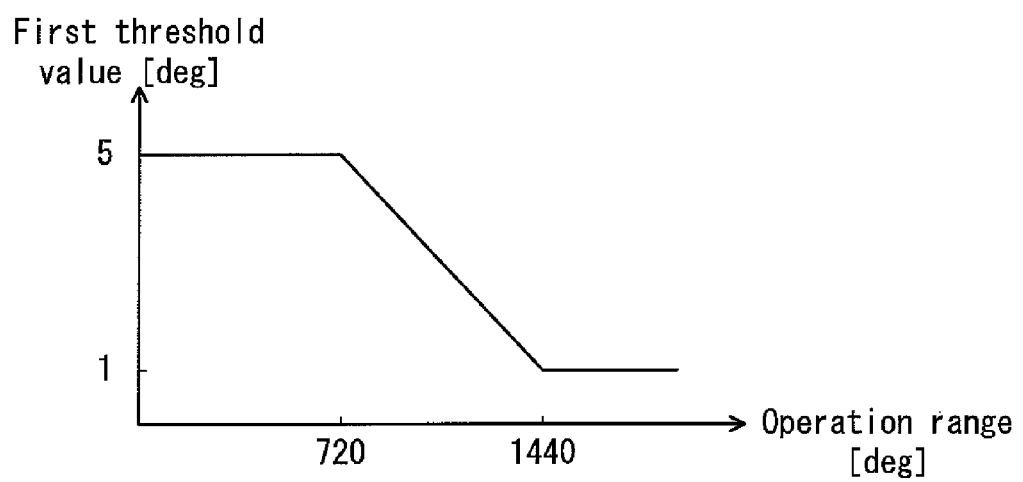

F I G. 1 5
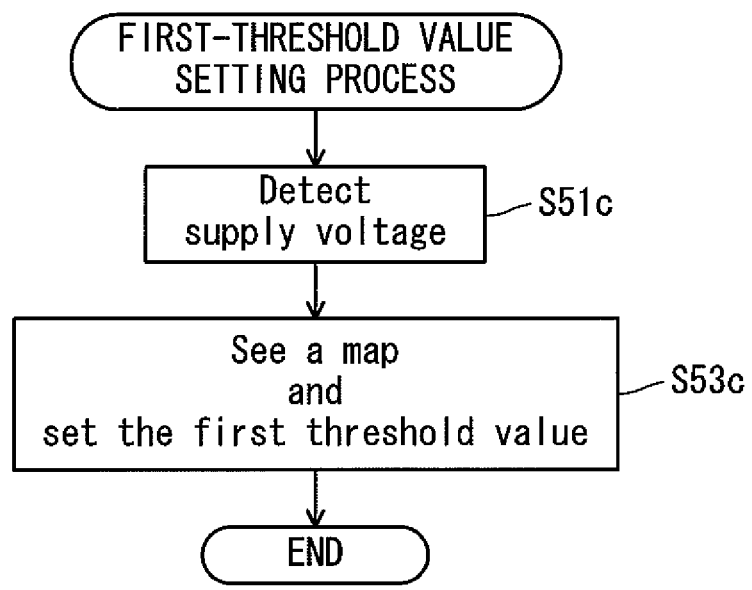

F I G. 1 6
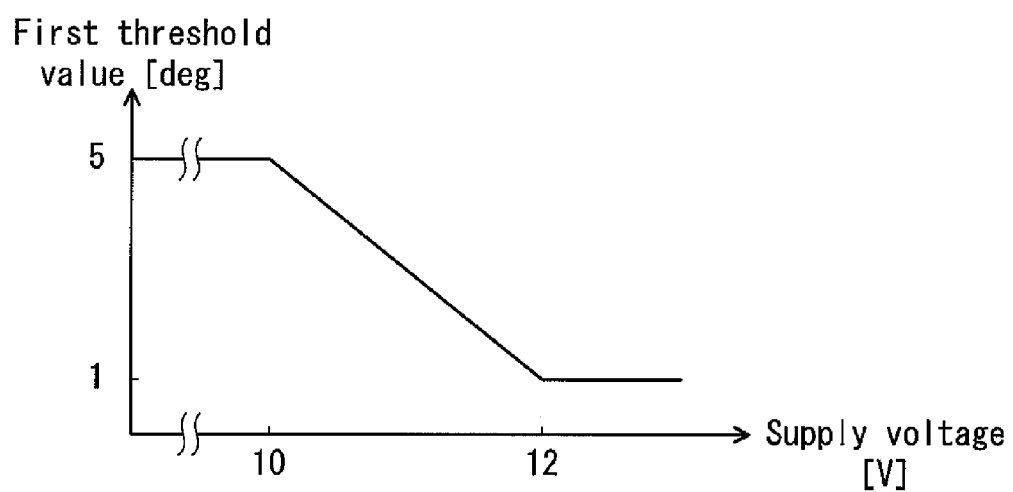

F I G. 1 7
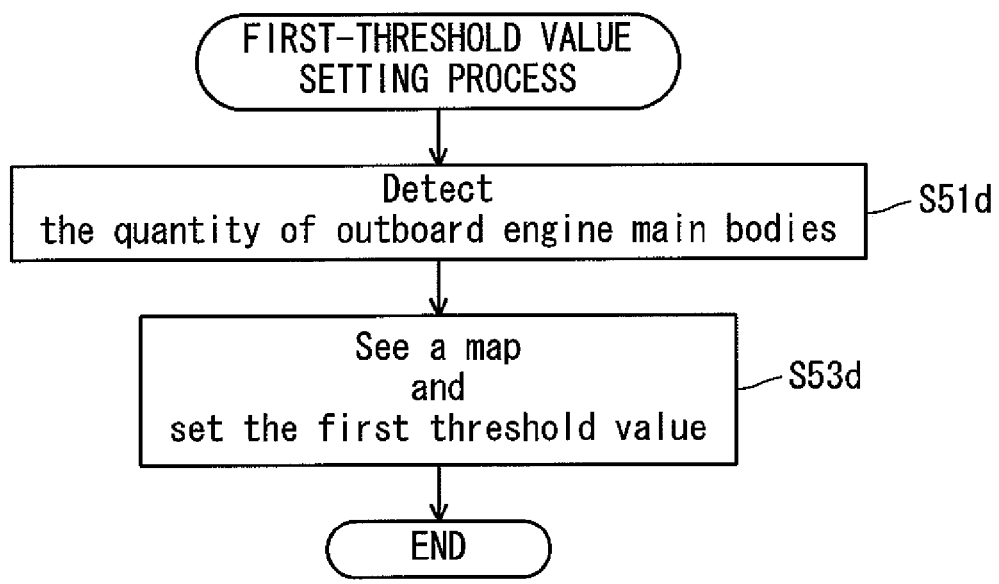

BOAT PROPELLING SYSTEM

BACKGROUND OF THE INVENTION

1. Field of the Invention

The present invention relates to boat propelling systems, and more specifically, to a boat propelling system including an electric motor arranged to pivot a propelling system main body in a right-left direction with respect to a hull.

2. Description of the Related Art

As disclosed in JP-A 2006-199189, for example, use of an electric motor to pivot an outboard engine (propelling system main body) in a right-left direction with respect to a hull for steering the hull is a conventional technique.

According to the technique in JP-A 2006-199189, a target pivot angle of a propelling system main body (e.g., outboard engine main body) which pivots with respect to the hull, is set by using a steering wheel turning angle or the like. Then, based on an angle difference between the target pivot angle and an actual pivot angle of the outboard engine, an amount of control of the electric motor is determined. The electric motor is driven in accordance with the determined amount of control and thus the outboard engine is pivoted in the right-left direction with respect to the hull.

However, if there is an abnormality such as deterioration of the electric motor, there can be cases where it is impossible to vary the actual pivot angle appropriately. Then, there will be an unacceptably large gap between the actual pivot angle and the target pivot angle. In other words, abnormalities regarding the steering on the propelling system main body can cause an unacceptably large gap between the user's operation and an actual behavioral change of the boat. JP-A 2006-199189 makes no consideration on this point, and therefore makes no disclosure, nor indication, regarding abnormality determination on the steering of outboard engine.

SUMMARY OF THE INVENTION

Preferred embodiments of the present invention provide a boat propelling system that is capable of determining an abnormality regarding steering of the propelling system main body.

According to a preferred embodiment of the present invention, a boat propelling system for propelling a hull includes a propelling system main body, a bracket section arranged to allow the propelling system main body to pivot in a right-left direction with respect to the hull, an actuator arranged to pivot the propelling system main body in the right-left direction, a steering section arranged to steer the propelling system main body, an operation information detection section arranged to detect operation information regarding an amount of operation provided to the steering section, an actual pivot angle detection section arranged to detect an actual pivot angle of the propelling system main body, a first calculating section arranged to calculate a target pivot angle change amount based on a target pivot angle of the propelling system main body derived from the operation information as well as based on a baseline target pivot angle, a second calculating section arranged to calculate an actual pivot angle change amount based on the actual pivot angle and a baseline actual pivot angle, a gap amount obtaining section arranged to obtain a gap amount between the target pivot angle change amount and the actual pivot angle change amount, and a determination section arranged to determine an abnormality regarding steering of the propelling system main body based on a result of comparison between the gap amount and a first threshold value.

In a preferred embodiment of the present invention, a target pivot angle change amount is calculated by subtracting a baseline target pivot angle from a target pivot angle of the propelling system main body, and an actual pivot angle change amount is calculated by subtracting a baseline actual pivot angle from an actual pivot angle. Then, a difference between the target pivot angle change amount and the actual pivot angle change amount is obtained as a gap amount, and a comparison is made between the gap amount and the first threshold value. If the gap amount is smaller than the first threshold value, it is determined that steering of the propelling system main body is normal. On the other hand, if the gap amount is not smaller than the first threshold value, it is determined that there is an abnormality in the steering of the propelling system main body. As described, an abnormality in the steering of the propelling system main body can be determined easily by comparing the gap amount with the first threshold value.

A continuous steering operation applied to the propelling system main body may result in a cumulative increase in the difference between the target pivot angle absolute value and the actual pivot angle absolute value with the passage of time. In this case, it is desirable to update the baseline target pivot angle and the baseline actual pivot angle as appropriate. For this reason, in a preferred embodiment of the present invention, the boat propelling system preferably further includes a baseline pivot angle setting section arranged to set the baseline target pivot angle and the baseline actual pivot angle, based on a result of comparison between the gap amount and a second threshold value. In this case, a new baseline target pivot angle and a baseline actual pivot angle are provided by a target pivot angle and an actual pivot angle respectively, obtained after the steering operation has been stopped and when the actual pivot angle is close enough to the target pivot angle, i.e., when the gap amount (the difference between the target pivot angle change amount and the actual pivot angle change amount) has become smaller than the second threshold value, for example. By updating the baseline target pivot angle and the baseline actual pivot angle as appropriate as described above, increased accuracy is ensured in calculating the target pivot angle change amount and the actual pivot angle change amount, and therefore the gap amount between the two change amounts. This is particularly advantageous in counter-steering operations.

Generally, when the hull's speed (boat speed) is slower, a behavioral change of the hull to the actual pivot angle change is smaller (in other words, the boat turns more slowly). This means that if the orientation of the hull is to be changed quickly, the user must operate the steering section quickly, which results in a quicker increase in the target pivot angle. For this reason, it can be assumed that a slower boat speed will result in a larger gap amount (steering delay) between the target pivot angle change amount and the actual pivot angle change amount even when all conditions allow appropriate steering operations. Also, in general, when the boat speed is slow, the trim angle is set to a small value in order to obtain large propulsion. Therefore, it can be assumed that a smaller trim angle will mean a slower boat speed, which will result in a larger gap amount between the target pivot angle change amount and the actual pivot angle change amount. Hence, in a preferred embodiment of the present invention, preferably, the bracket section allows the propelling system main body to pivot in an up-down direction with respect to the hull, and the boat propelling system further includes a speed information detection section arranged to detect speed information regarding a speed of the hull, a trim angle detection section arranged to detect a trim angle of the propelling system main body, and a threshold value setting section arranged to set the first threshold value based on at least one of the speed information and the trim angle. In this case, setting of the first threshold value is based on at least one of the speed information regarding the speed of the hull and the trim angle of the propelling system main body. This ensures appropriate determination of an abnormality regarding the steering of the propelling system main body in accordance with the state of travel of the hull (boat).

When the boat speed is slower, the behavioral change of the boat to the actual pivot angle change is smaller. It is desirable therefore, that a small operation of the steering section is enough to make a large change in the actual pivot angle when the boat speed is slow. In consideration of this, it is common to design a system which will narrow the steering section operation range when the boat speed is slow than when the boat speed is fast. In this case, it can be assumed that a narrower operation range means a slower boat speed and a larger gap amount between the target pivot angle change amount and the actual pivot angle change amount. Hence, preferably in a preferred embodiment of the present invention, the boat propelling system further includes an operation range setting section arranged to set an operation range of the steering section, and a threshold value setting section arranged to set the first threshold value based on the operation range. In this case, when the operation range of the steering section is small, a large first threshold value is selected based on the understanding that the boat speed is slow. This ensures appropriate determination of an abnormality regarding the steering of the propelling system main body in accordance with the state of travel of the hull.

It is also common to increase a pivot angle ratio so that a small amount of operation to the steering section will make a large change in actual pivot angle when the boat speed is slow. In this case, it can be assumed that a larger pivot angle ratio means a slower boat speed and a larger angle difference between the target pivot angle change amount and the actual pivot angle change amount. Hence, preferably in a preferred embodiment of the present invention, the boat propelling system further includes a pivot angle ratio setting section arranged to set a pivot angle ratio, and a threshold value setting section arranged to set the first threshold value based on the pivot angle ratio. In this case, when the pivot angle ratio is large, a large first threshold value is selected based on the understanding that the boat speed is slow. This ensures appropriate determination of an abnormality regarding the steering of the propelling system main body in accordance with the state of travel of the hull.

Power supply equipment mounted in the hull varies in performance from a hull to another. Thus, an increased amount of power supply from the power supply equipment to other components than the boat propelling system can decrease power supply to the boat propelling system, which can increase the gap amount between the target pivot angle change amount and the actual pivot angle change amount. Hence, preferably in a preferred embodiment of the present invention, the actuator includes an electric motor, and the boat propelling system further includes an electric power information detection section arranged to detect electric power information regarding electric power supplied to the electric motor, and a threshold value setting section arranged to set the first threshold value based on the electric power information. In this case, when the electric power information indicates a small value, a large first threshold value is selected. This ensures appropriate determination of an abnormality regarding the steering of the propelling system main body regardless of the performance of power supply equipment mounted in the hull.

When the boat propelling system includes a large quantity of propelling system main bodies, the boat has large propelling power and greater agility. In other words, if the quantity of propelling system main bodies is large, a total propelling force is large and therefore a small steering operation can accomplish a behavior which is close enough to the user's desire even if a steering movement in each of the outboard engine main bodies is not large. On the other hand, if the quantity of propelling system main bodies is small, the propelling force is small, so the boat cannot move agilely and it is therefore necessary to make a large steering operation in each of the propelling system main bodies when turning the boat's direction for example. However, a large steering operation results in an increased amount of steering delay, i.e., a large gap amount between the target pivot angle change amount and the actual pivot angle change amount. Hence, preferably in a preferred embodiment of the present invention, the boat propelling system further includes a threshold value setting section arranged to set the first threshold value based on a quantity of the propelling system main bodies included in the boat propelling system. In this case, when the quantity of the propelling system main bodies included in the boat propelling system is smaller, a larger first threshold value is selected. This ensures appropriate determination of an abnormality regarding the steering of propelling system main bodies regardless of the quantity of propelling system main bodies.

It should be noted here that "pivot angle ratio" means a ratio of the actual pivot angle to the steering section's steering angle.

The above-described and other features, elements, characteristics, steps, aspects and advantages of the present invention will become clearer from the following detailed description of preferred embodiments of the present invention with reference to the attached drawings.

BRIEF DESCRIPTION OF THE DRAWINGS

FIG. 4 is a perspective view for describing a configuration of a swivel bracket of the outboard engine in FIG. 1.

FIG. 5 is a side view for describing the configuration of the swivel bracket of the outboard engine in FIG. 1.

FIG. 11 is a graph showing a relationship between an operation range in a steering section and actual pivot angle.

FIG. 12 a graph showing a relationship between an operation range in a steering section and the first threshold value.

FIG. 15 is a flowchart showing still another example of the first-threshold value setting process.

FIG. 16 is a graph showing a relationship between supply voltage to an electric motor and the first threshold value.

FIG. 17 is a flowchart showing still another example of the first-threshold value setting process.

DETAILED DESCRIPTION OF THE PREFERRED EMBODIMENTS

Hereinafter, preferred embodiments of the present invention will be described with reference to the drawings.

The description will cover an example in which a boat propelling system 10 according to a preferred embodiment of the present invention is installed in a boat 1. A symbol "FWD" which appears in some of the drawings indicates a forward travelling direction of the boat 1.

Figure 2:
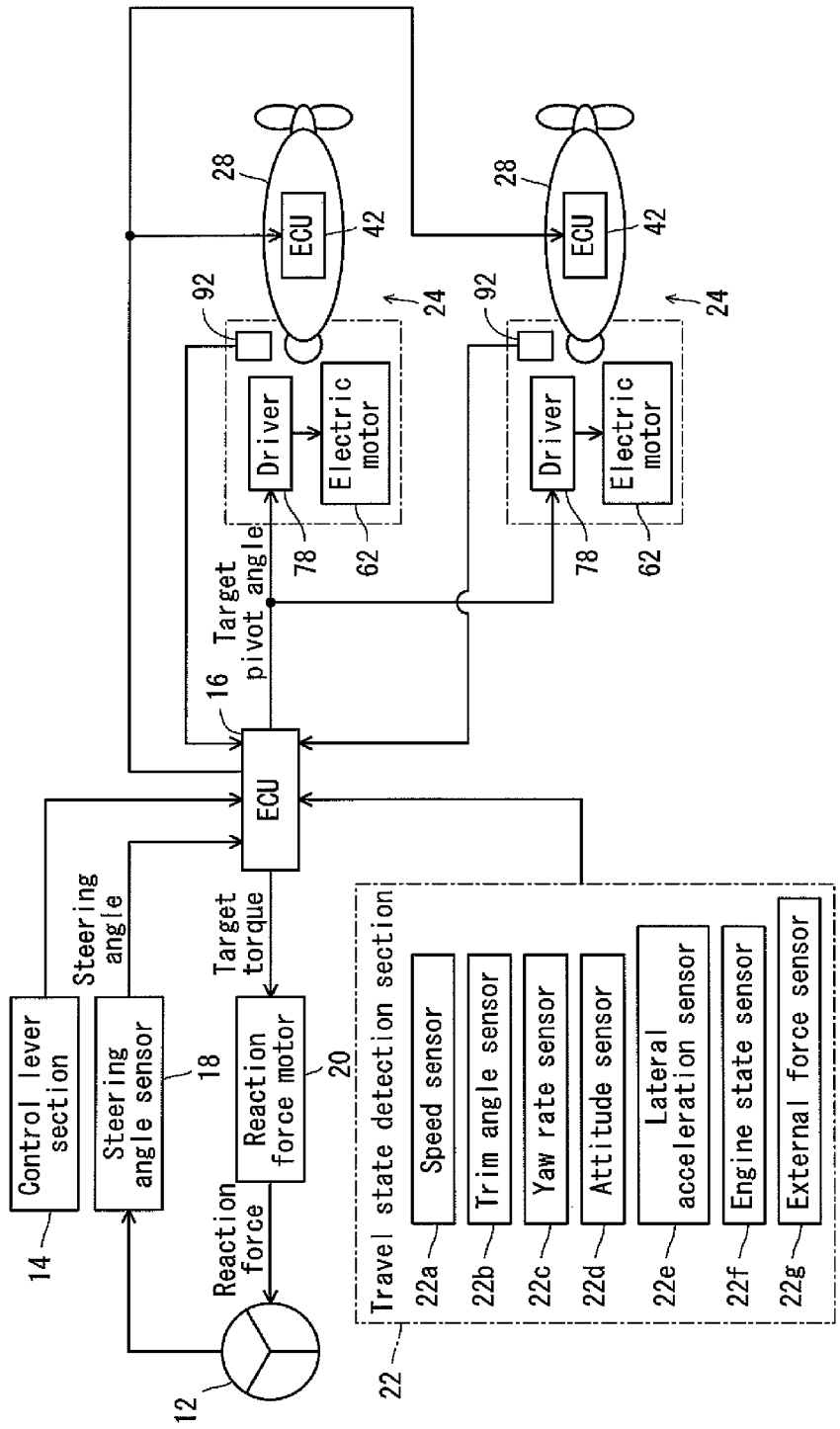
FIG. 2 is a block diagram showing a configuration of the boat propelling system in FIG. 1.

Referring also to FIG. 2, the boat 1 includes a hull 2 and a boat propelling system 10 installed on the hull 2.

The boat propelling system 10 includes a steering section 12 arranged inside the hull 2 to steer outboard engine main bodies 28 (to be described later); a control lever section 14 arranged near the steering section 12 to perform a forward-moving or rearward-moving operation of the hull 2; an ECU (Electronic Control Unit) 16 arranged and programmed to control operations of the boat propelling system 10; a steering angle sensor 18 arranged to detect a steering angle of a rotating operation of the steering section 12; a reaction force motor 20 which is connected to the steering section 12 to provide the steering section 12 with a reaction force; a travel state detection section 22 arranged to detect a state of travel of the boat 1; and a plurality (e.g., two or more) of outboard engines 24 mounted on a transom board 3 of the hull 2 in order to propel the boat 1. The travel state detection section 22 preferably includes a speed sensor 22a, a trim angle sensor 22b, a yaw rate sensor 22c, an attitude sensor 22d, a lateral acceleration sensor 22e, an engine state sensor 22f, and an external force sensor 22g. The speed sensor 22a detects a speed of the boat 1 (a boat speed) by using a GPS, for example. The trim angle sensor 22b detects a trim angle of the outboard engine main bodies 28 by detecting an amount of stroke of trim cylinders, for example. The yaw rate sensor 22c detects a state of turning of the boat 1. The attitude sensor 22d detects an attitude of the boat 1 indicated by a roll angle, a pitch angle or the like, by using a gyroscope, for example. The lateral acceleration sensor 22e detects a centrifugal force applied to the boat 1 during a turn. The engine state sensor 22f detects a throttle opening degree and the number of revolutions of the engine. The external force sensor 22g detects an external force applied to the outboard engine main bodies 28, preferably via load sensors, for example, provided in the outboard engine main bodies 28. These elements may preferably be electrically interconnected, for example, by a LAN cable 26.

Next, the outboard engines 24 will be described.

The outboard engines 24 do not have rudders but provide steering as the outboard engines 24 are moved like a rudder.

Figure 3:
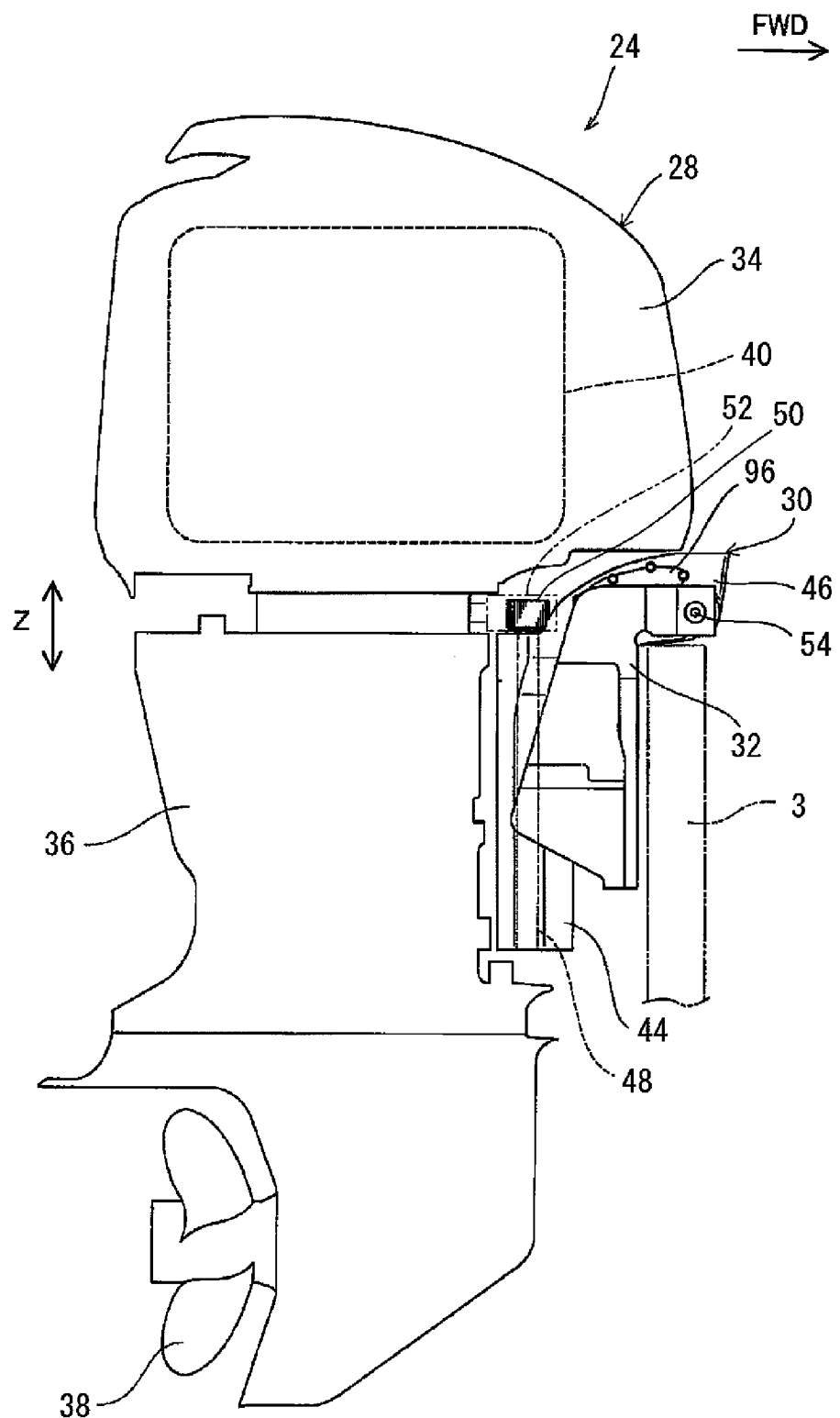
FIG. 3 is a side view showing an overall configuration of an outboard engine in FIG. 1.

Referring to FIG. 3, each outboard engine 24 includes an outboard engine main body 28, a swivel bracket 30 and tilt brackets 32.

The outboard engine main body 28 includes, from top to down, a cowling section 34, a case section 36 and a propeller 38. In the outboard engine 24, the outboard engine main body 28 is pivoted in the right-left direction to change the direction of the propeller 38. The hull 2 changes its direction as it receives propelling force from the propellers 38.

The cowling section 34 houses such components as an engine 40 and the ECU 42 (see FIG. 1) which is electrically connected with the engine 40.

The swivel bracket 30 includes a bracket lower portion 44 and a bracket upper portion 46.

The bracket lower portion 44 is a hollow tube provided in an up-down direction (Direction Z) of the outboard engine main body 28. Into the bracket lower portion 44, a swivel shaft 48 is pivotably inserted, so the swivel shaft 48 is held to extend in the up-down direction (Direction Z) of the outboard engine main body 28. The swivel shaft 48 includes an upper end 50, which is connected with the outboard engine main body 28 via a connection fitting 52. Thus, the outboard engine main body 28 is mounted to the swivel bracket 30 pivotably around the swivel shaft 48, i.e., pivotably in the right-left direction (indicated by Arrow X1 and Arrow X2 in FIG. 1) relative to the hull 2.

The swivel bracket 30 is sandwiched between a pair of tilt brackets 32. The tilt brackets 32 are fixed to the transom board 3 on the rear side of the hull 2. The swivel bracket 30 and the tilt brackets 32 are penetrated by a tilt shaft 54. The tilt shaft 54 extends perpendicularly or substantially perpendicularly to the swivel shaft 48, in a widthwise direction (indicated by Arrow X1 and Arrow X2 in FIG. 1) of the hull 2. Thus, the swivel bracket 30, i.e., the outboard engine main body 28 is pivotable around the tilt shaft 54, in the up-down direction (Direction Z) relatively to the hull 2. In other words, the outboard engine main body 28 is pivotable around the tilt shaft 54 by a tilt cylinder (not illustrated), and is pivoted up to a near horizontal position when the boat comes ashore, for example. The outboard engine main body 28 is also pivotable around the tilt shaft 54 by a trim cylinder (not illustrated). Thus, the trim angle of the outboard engine main body 28 is adjustable, so that an up-down propelling direction of the propellers 38 is adjusted within a given vertical plane, during navigation. In the present preferred embodiment, the trim angle is "zero" degree when the swivel shaft 48 is perpendicular to the bottom of the boat. Further, the expression "the trim angle increases" means that the outboard engine main body 28 is pivoted so that the propeller 38 moves away from the transom board 3.

Figure 6:
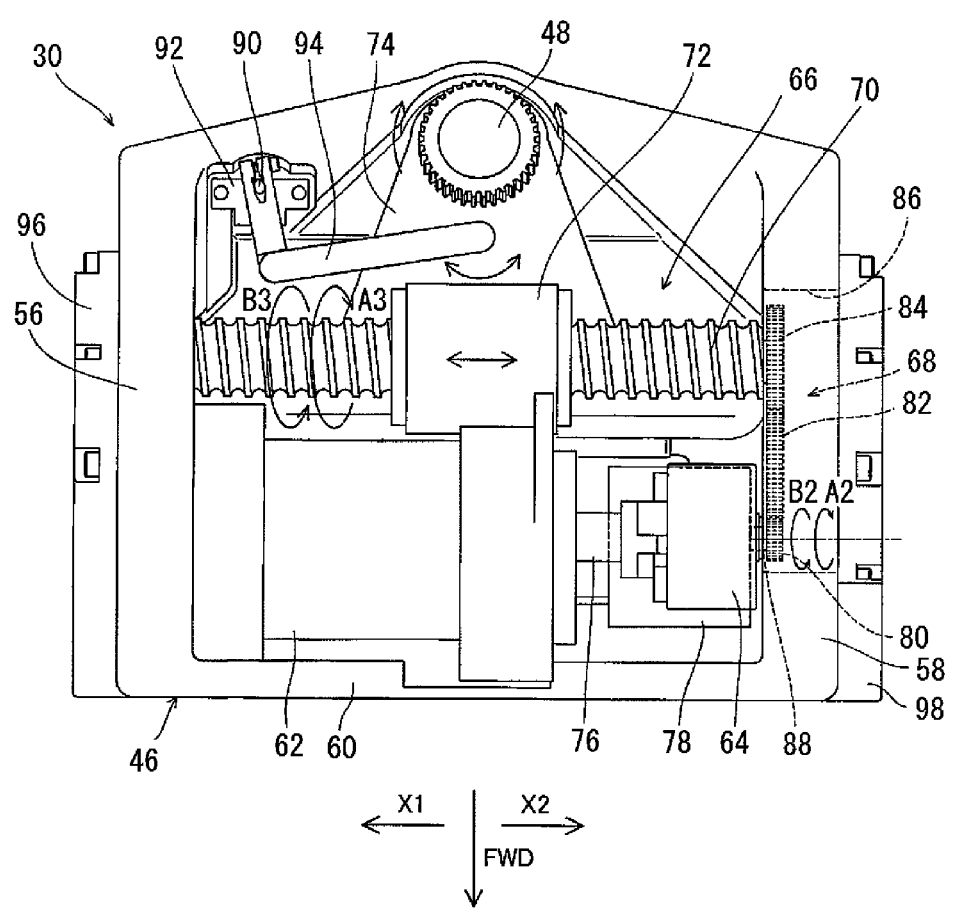
FIG. 6 is a plan view for describing the configuration of the swivel bracket of the outboard engine in FIG. 1.

Next, reference will also be made to FIG. 4 through FIG. 6 to describe the swivel bracket 30.

The bracket upper portion 46 is at an upper end of the bracket lower portion 44, protruding in the forward direction (Direction indicated by Arrow FWD). The bracket upper portion preferably has a substantially upward opening box configuration, and includes a pair of two side wall portions 56, 58 each having an increasing height toward the front as viewed from a side; and a front wall portion 60 which connects these two side wall portions 56, 58 at their front ends. The upper end 50 of the swivel shaft 48 which is inserted into the bracket lower portion 44 protrudes in the bracket upper portion 46.

The bracket upper portion 46 houses an electric motor 62, a locking clutch 64 and most of a transmission mechanism 66.

The transmission mechanism 66, which transmits the driving force of the electric motor 62 to the outboard engine main body 28, includes a gear section 68; a ball screw 70 connected with the gear section 68; a ball nut 72 engaged with the ball screw 70 movably on the ball screw 70; a transmission plate 74 which connects the ball nut 72 with the swivel shaft 48; the swivel shaft 48; and the connection fitting 52.

The electric motor 62 is provided inside the swivel bracket 30, near the front wall portion 60 closer to the side wall portion 56, with its motor shaft 76 extending in the widthwise direction of the hull 2 (indicated by Arrow X1 and Arrow X2). The electric motor 62 provides power to pivot the outboard engine main body 28. The electric motor 62 is electrically connected with a driver 78. When the user performs a steering operation in the steering section 12, the driver 78 receives operation signals via the LAN cable 26 and controls the operation of electric motor 62 based on the signals. Specifically, when the steering section 12 is being rotated in the clockwise direction (Arrow A1 direction: see FIG. 1), the driver 78 controls the electric motor 62 so that the motor shaft 76 will rotate in Arrow A2 direction. On the other hand, when the steering section 12 is being rotated in the counterclockwise direction (Arrow B1 direction: see FIG. 1), the driver 78 controls the electric motor 62 so that the motor shaft 76 will rotate in Arrow B2 direction.

The locking clutch 64 is disposed coaxially with the motor shaft 76 of the electric motor 62, connects the motor shaft 76 with the gear section 68 and transmits the driving force from the electric motor 62 toward the swivel shaft 48, i.e., toward the outboard engine main body 28. However, the locking clutch 64 also has a locking capability of not transmitting an external force (reaction force) from the outboard engine main body 28 to the electric motor 62 thereby preventing the outboard engine main body 28 from being pivoted in the right-left direction by the external force. The locking clutch 64 preferably is a reverse input shutoff clutch which is provided by, e.g., a product called "Torque Diode" (Registered Trademark) manufactured by NTN Corporation. Thus, as the motor shaft 76 rotates, rotation of the motor shaft 76 is transmitted to the locking clutch 64 and to the gear section 68 connected therewith. On the other hand, when the outboard engine main body 28 receives a pivoting force in the right-left direction during navigation, for example, and even if the gear section 68 receives a rotational force, the gear section 68 will not rotate since the locking clutch 64 will lock and prevent the gear section 68 from rotating. In other words, during navigation, even if reaction forces applied by the water or other forces act in the right-left direction with respect to the outboard engine main body 28, the locking clutch 64 works and there is no need for driving the electric motor 62 in order to maintain the pivot angle. The locking clutch 64 of such a simple configuration eliminates the need for keeping the electric motor 62 always in drive.

The gear section 68 serves as reduction gears and as shown in FIG. 5 and FIG. 6, preferably is provided at an opening 86 in the side wall portion 58, and preferably includes three flat gears 80, 82 and 84. The flat gear 80, which is connected with a shaft member 88 protruding from a downstream side (the side closer to the side wall portion 58) of the locking clutch 64, rotates with the shaft member 88. The flat gear 82 is engaged with the flat gear 80 and also with the flat gear 84. In other words, the flat gear 82 serves as a middle gear which transmits the rotation of the flat gear 80 to the flat gear 84. The flat gear 84 is connected with the ball screw 70 and is rotated integrally with the ball screw 70.

As the ball screw 70 rotates, the ball nut 72 moves axially of the ball screw 70 (in direction indicated by Arrow X1 and Arrow X2). Specifically, as the motor shaft 76 rotates in Arrow A2 direction, the gear section 68 rotates the ball screw 70 in Arrow A3 direction, and the ball nut 72 moves toward the side wall portion 58 (in Arrow X2 direction). On the other hand, as the motor shaft 76 rotates in Arrow B2 direction, the gear section 68 rotates the ball screw 70 in Arrow B3 direction, and the ball nut 72 moves toward the side wall portion 56 (in Arrow X1 direction).

The transmission plate 74 is connected with the ball nut 72 and also engaged with the swivel shaft 48. Thus, the transmission plate 74 can pivot around the swivel shaft 48 as the ball nut 72 moves in Arrow X1 direction or Arrow X2 direction, allowing the swivel shaft 48 to rotate to pivot the outboard engine main body 28. As the ball nut 72 moves toward the side wall portion 58 (in Arrow X2 direction), the outboard engine main body 28 is steered in Arrow X1 direction while it is steered in Arrow X2 direction as the ball nut 72 moves toward the side wall portion 56 (in Arrow X1 direction).

Near the transmission plate 74 and closely to the side wall portion 56, a pivot sensor 92 is provided to detect a pivoting angle of its pivot shaft 90. The pivot sensor 92 is connected with the transmission plate 74 via a link member 94. The link member 94 is moved by a pivotal movement of the transmission plate 74 around the swivel shaft 48, and as the link member 94 moves, the pivot shaft 90 of the pivot sensor 92 pivots. The pivot sensor 92 detects the pivoting angle of the pivot shaft 90, based on which the ECU 16 calculates a pivoting angle of the transmission plate 74, i.e., an actual pivot angle of the outboard engine main body 28.

With the above described arrangement, a plate member 96 is attached to the side wall portion 56 of the bracket upper portion 46 whereas a plate member 98 is attached to the side wall portion 58 to cover the opening 86. Also, a cover member 100 is attached as shown in FIG. 5, on the upper surface of the bracket upper portion 46 so as to cover the entire upper opening, thereby sealing the inside space of the bracket upper portion 46.

Returning to FIG. 2, in the boat propelling system 10 as described so far, the ECU 16 includes a CPU and a memory. The memory stores programs for performing operations shown in FIG. 7, FIG. 8, FIG. 10, FIG. 13, FIG. 15 and FIG. 17; maps which contain information shown in FIG. 9, FIG. 11, FIG. 12, FIG. 14, FIG. 16, and FIG. 18 through FIG. 20; and other information and programs.

The ECU 16 receives a signal which indicates the steering angle of the steering section 12, from the steering angle sensor 18; a control signal from the control lever section 14; a signal which indicates the pivot angle, from the pivot sensor 92; and sensor signals from the sensors in the travel state detection section 22.

The ECU 16 calculates a target torque in accordance with a given steering angle and a state of external force, and gives the calculated target torque to the reaction force motor 20. The reaction force motor 20 outputs a reaction force torque in accordance with the given target torque to the steering section 12. This provides various operation feelings from heavy to light as the user operates the steering section 12.

Also, the ECU 16 sends a signal, which indicates a target pivot angle given by the user as he/she rotates the steering section 12, to the driver 78 inside the swivel bracket 30. The ECU 16 thereby controls steering of the outboard engine main body 28. Further, the ECU 16 sends a signal which represents the user's operation of the control lever section 14 to the ECU 42 inside the outboard engine main body 28, thereby controlling the output of the engine 40. The propeller 38 rotates as the engine 40 drives.

In the present preferred embodiment, the outboard engine main body 28 represents the propelling system main body. The bracket section includes the swivel bracket 30 and the tilt bracket 32. The operation information detection section includes the steering angle sensor 18; the actual pivot angle detection section includes the pivot sensor 92 and the ECU 16; the speed information detection section includes the engine state sensor 22f; the trim angle detection section includes the trim angle sensor 22b; and the electric power information detection section includes the driver 78 and the ECU 16. Also, the ECU 16 functions as the first calculating section, the second calculating section, the gap amount obtaining section, the determination section, the baseline pivot angle setting section, the threshold value setting section, the operation range setting section and the pivot angle ratio setting section.

Now, an operation example of the boat 1 which is equipped with the boat propelling system 10 as the above will be described with reference to FIG. 7 through FIG. 20.

Figure 7:
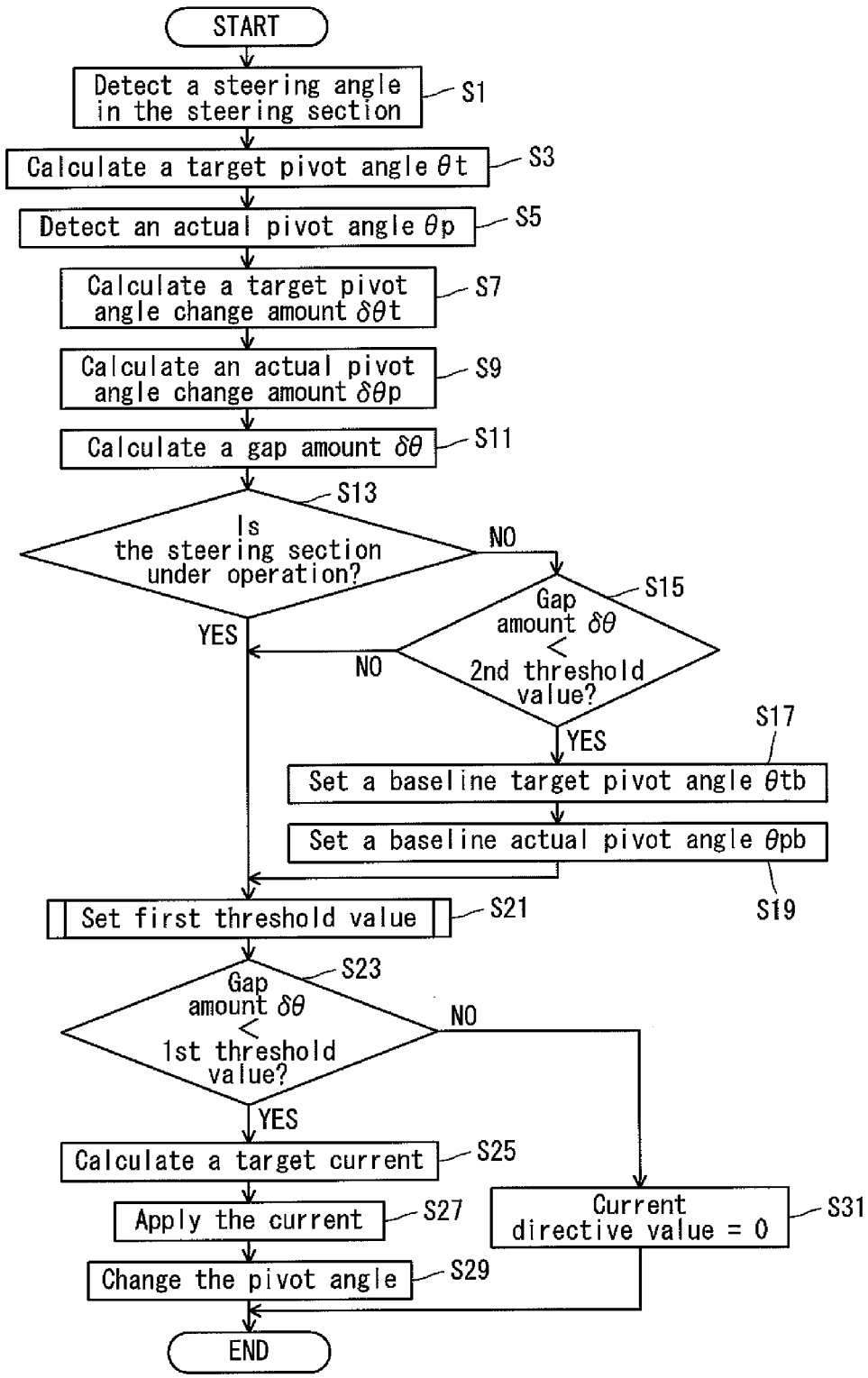
FIG. 7 is a flowchart showing an example of operation regarding steering according to a preferred embodiment of the present invention.

Reference will be made to FIG. 7, to describe operations regarding steering.

First, the steering angle sensor 18 detects a steering angle in the steering section 12 (Step S1), and the ECU 16 calculates a target pivot angle θt based on the steering angle (Step S3). Then, the pivot sensor 92 detects a pivot angle of the pivot shaft 90, and the ECU 16 detects an actual pivot angle θp in the outboard engine main body 28 based on the detected pivot angle (Step S5).

After Step S5, the ECU 16 subtracts the baseline target pivot angle θtb from the target pivot angle θt calculated in Step S3, thereby calculating a target pivot angle change amount δθt (Step S7). The ECU 16 also subtracts the baseline actual pivot angle θpb from the actual pivot angle θp detected in Step S5, thereby calculating an actual pivot angle change amount δθp (Step S9). In the first cycle of operation of the process shown in FIG. 7, the baseline target pivot angle θtb and the baseline actual pivot angle θpb are set to their respective initial values (0°, for example), and these values are updated as necessary as will be described later.

After Step S9, the ECU 16 subtracts the change amount δθp from the change amount δθt, thereby calculating a gap amount δθ (Step S11). Then, the ECU 16 determines whether or not the steering section 12 is being operated (Step S13). Whether or not the steering section 12 is being operated can be determined based on an output from the steering angle sensor 18, for example. If the steering section 12 is not being operated, the ECU 16 determines whether or not the gap amount δθ is smaller than a second threshold value (0.3°, for example) (Step S15). If the gap amount δθ is smaller than the second threshold value, the ECU 16 sets the value of target pivot angle θt which was calculated in Step S3 to the baseline target pivot angle θtb (Step S17), and sets a value of the actual pivot angle θp detected in Step S5 to the baseline actual pivot angle θpb (Step S19). In other words, the baseline target pivot angle θtb is updated to the currently calculated target pivot angle θt, and the baseline actual pivot angle θpb is updated to the currently detected actual pivot angle θp. Then, the process goes to Step S21. If Step S13 determines that the steering section 12 is being operated, or if Step S15 determines that the gap amount δθ is not smaller than the second threshold value, the process also goes to Step S21.

In Step S21, the ECU 16 performs a first-threshold value setting process, and then determines whether or not the gap amount δθ is smaller than the first threshold value which was set in the process (Step S23). If the gap amount δ is smaller than the first threshold value, the ECU 16 determines that there is no abnormality regarding the steering of the outboard engine main body 28, calculates an angle difference between the target pivot angle θt calculated in Step S3 and the actual pivot angle θp detected in Step S5, and calculates a target current based on the angle difference (Step S25). Then, the ECU 16 gives the driver 78 a command for applying the calculated target current to the electric motor 62, whereupon the power application is made to the electric motor 62 (Step S27). Thus, the power from the electric motor 62 is transmitted via the transmission mechanism 66 to the outboard engine main body 28, to turn the outboard engine main body 28 (Step S29), and the process comes to an end. On the other hand, if Step S23 determines that the gap amount δθ is not smaller than the first threshold value, the ECU 16 determines that there is an abnormality regarding the steering of the outboard engine main body 28, prevents the electric motor 62 from driving by setting an electric current directive value to zero (Step S31), and brings the process to an end. The operation shown in FIG. 7 is repeated in a time interval of 5 milliseconds, for example.

Next, reference will be made to FIG. 8 to describe an example of the first-threshold value setting process in Step S21 in FIG. 7.

Figure 9:
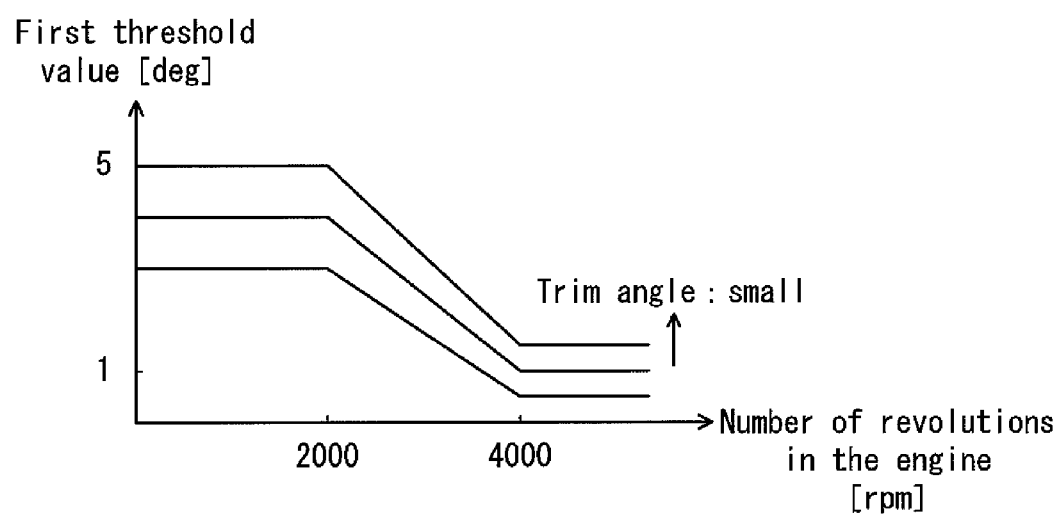
FIG. 9 is a graph showing a relationship between an engine's number of revolutions, trim angle and the first threshold value.

First, the engine state sensor 22f detects the number of revolutions in the engine 40 whereas the trim angle sensor 22b detects a trim angle of the outboard engine main body 28 (Step S51). Then, the ECU 16 makes reference to a map which contains information as shown in FIG. 9, sets the first threshold value based on the detected number of revolutions and trim angle (Step S53), and then brings the process to Step S23 in FIG. 7.

Generally, when the boat speed is slower, the behavioral change of the hull 2 to the actual pivot angle change is smaller. This means that if the orientation of the hull 2 is to be changed quickly, the user must operate the steering section 12 quickly. Based on this, it can be assumed that the angle difference between the target pivot angle and the actual pivot angle will be larger when the boat speed is slower. Also, in general, when the boat speed is slow, the trim angle is set to a small value in order to obtain large propulsion. Therefore, it can be assumed that when the trim angle is smaller, the boat speed is slower and the gap amount between the target pivot angle change amount and the actual pivot angle change amount is larger. Corresponding to this, the map used in Step S53 gives a smaller first threshold value for a larger value of speed information, i.e., a larger number of revolutions in the engine 40; and a larger first threshold value for a smaller trim angle (see FIG. 9).

According to the boat propelling system 10 as described, it is possible to determine, easily, an abnormality regarding the steering of the outboard engine main body 28 by first obtaining the gap amount δθ between the target pivot angle change amount δθt and the actual pivot angle change amount δθp, and then comparing the obtained value to the first threshold value.

If the gap amount δθ is smaller than the second threshold value, the currently obtained target pivot angle θt and the currently detected actual pivot angle θp are used as the baseline target pivot angle θtb and the baseline actual pivot angle θpb for the next and later cycles of operation. This provides an advantage of avoiding a possible problem that continuous steering operation on the outboard engine main body 28 may result in a cumulative increase in the difference between the target pivot angle absolute value and the actual pivot angle absolute value. By appropriately updating the baseline target pivot angle θtb and the baseline actual pivot angle θpb as described above, increased accuracy is ensured in calculating the target pivot angle change amount δθt and the actual pivot angle change amount δθp, and therefore the gap amount δθ between the two change amounts. This is particularly advantageous in counter-steering operations.

By setting the first threshold value based on the number of revolutions in the engine 40 and the trim angle of the outboard engine main body 28, an abnormality regarding the steering of the outboard engine main body 28 can be determined appropriately in accordance with the state of travel of the hull 2.

Next, reference will be made to FIG. 10 to describe another example of the first-threshold value setting process in Step S21 in FIG. 7.

As has been described earlier, when the boat speed is slow, behavioral change of the hull 2 to the actual pivot angle change is small. Based on this, it is common to design a steering system which will narrow an operation range of the steering section 12 (total angle of rotation: lock-to-lock) when the boat speed is slow so that a smaller amount of operation will be enough to make a large change in the actual pivot angle. With this design, it is possible to change quickly the direction of the hull 2 even when the boat speed is slow.

Figure 10:
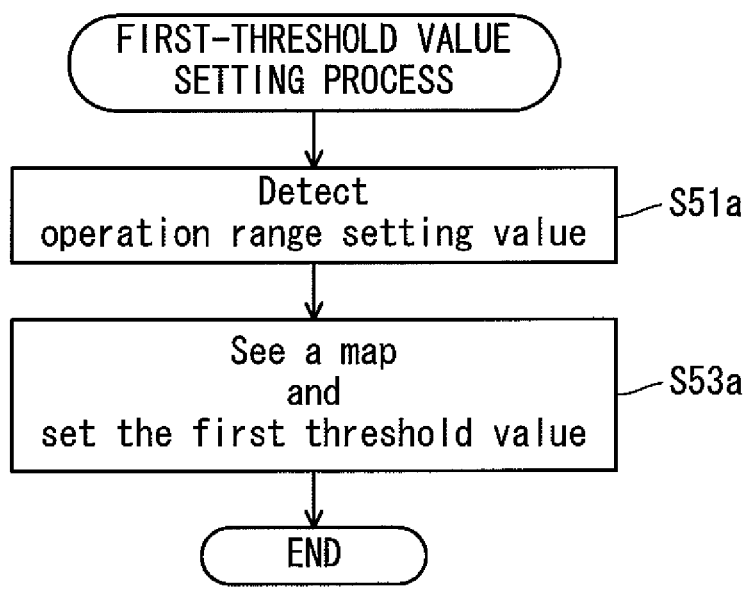
FIG. 10 is a flowchart showing another example of the first-threshold value setting process.

The first-threshold value setting process in FIG. 10 is used in cases where the operation range of the steering section 12 is varied in accordance with the boat speed. As shown in FIG. 11 for example, the operation range is set to ±720° as indicated by a solid line R1 when the boat speed is not slower than 40 km/h, for example; to ±360° as indicated by a alternate long and short dash line R2 when the boat speed is not faster than 10 km/h, for example; and the range is gradually changed when the boat speed is between these two settings. In other words, the lock-to-lock is set to four full turns when the boat speed is not slower than 40 km/h, for example; to two full turns when the boat speed is not faster than 10 km/h, for example; and is changed gradually when the boat speed is between these two settings. Such a setting on the operation range of the steering section 12 is performed by the ECU 16, and values for these settings are stored in the memory in the ECU 16.

Figure 1:
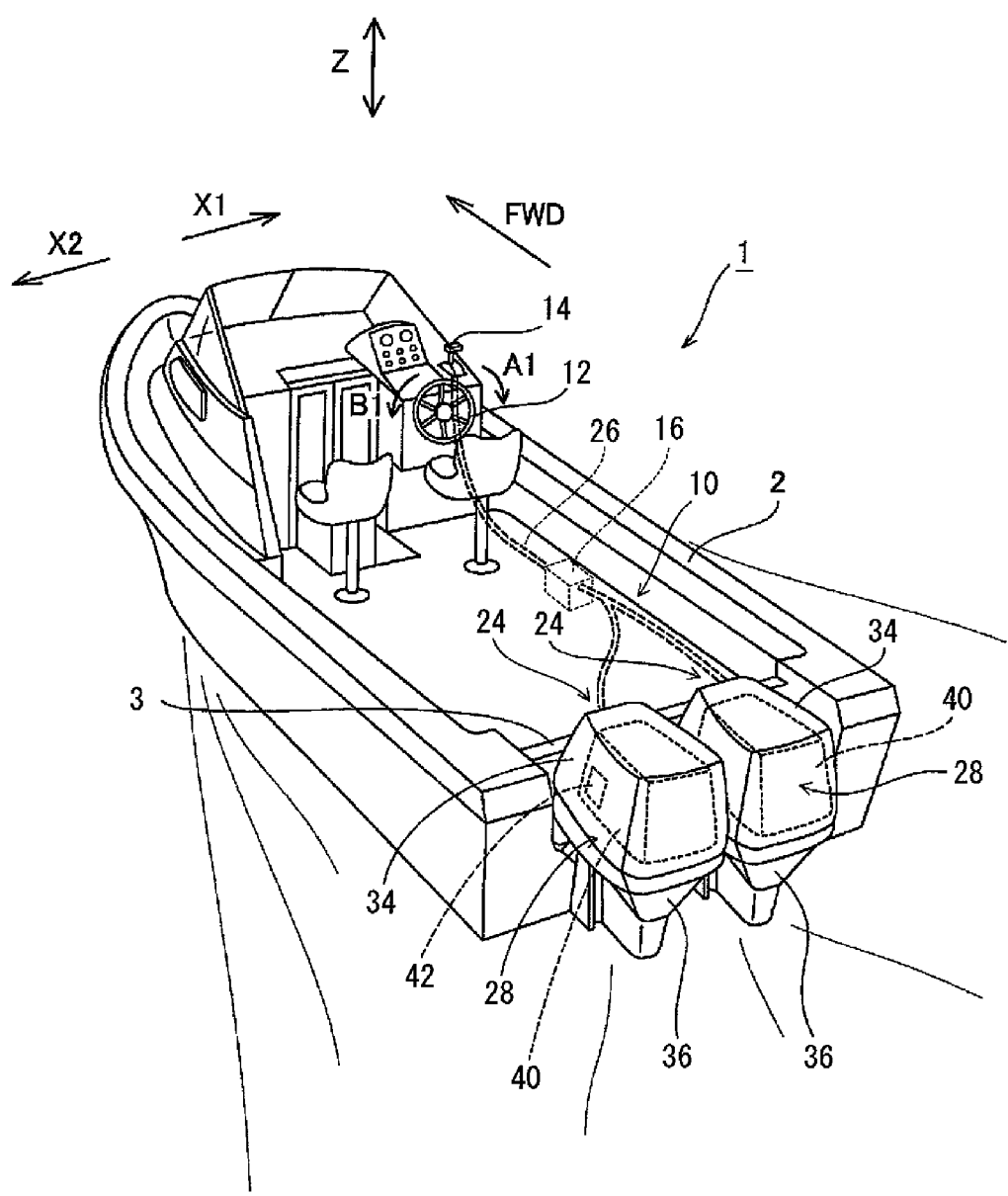
FIG. 1 is a perspective view showing an example of a boat which is equipped with a boat propelling system according to a preferred embodiment of the present invention.

It should be noted here that in FIG. 11, "+" signs in the horizontal axis mean to turn the steering section 12 in Arrow A1 direction (see FIG. 1) whereas "−" signs in the horizontal axis mean to turn the steering section 12 in Arrow B1 direction (see FIG. 1). Also in FIG. 11, a "+" sign in the vertical axis means to steer the outboard engine main body 28 in Arrow X1 direction (see FIG. 1) whereas a "−" sign in the vertical axis means to steer the outboard engine main body 28 in Arrow X2 direction (see FIG. 1).

In the first-threshold value setting process in FIG. 10, the ECU 16 first detects operation range setting value of the steering section 12 (Step S51a). Then, the ECU 16 makes reference to a map which contains information as shown in FIG. 12, and sets the first threshold value based on the detected operation range (Step S53a). As described earlier, based on the design principle that a slower boat speed will lead to a setting of smaller operation range, it is assumed that a smaller operation range means a slower boat speed, and further, that a smaller operation range means a larger angle difference between the target pivot angle and the actual pivot angle. Correspondingly to these, the map used in Step S51a gives a larger first threshold value when the operation range is smaller (see FIG. 12).

Setting the first threshold value based on the operation range of the steering section 12 as described above also ensures appropriate determination of an abnormality regarding the steering of the outboard engine main body 28 in accordance with the state of travel of the hull 2.

Next, reference will be made to FIG. 13 to describe still another example of the first-threshold value setting process in Step S21 in FIG. 7.

As has been described earlier, when the boat speed is slow, the behavioral change of the hull 2 to the actual pivot angle change is small. Based on this, it is common to design a steering system which will increase a pivot angle ratio (a ratio of the actual pivot angle to the steering angle of the steering section 12) when the boat speed is slow so that a smaller amount of operation will be enough to make a large change in the actual pivot angle. With this design, it is possible to change quickly the direction of the hull 2 even when the boat speed is slow.

Figure 13:
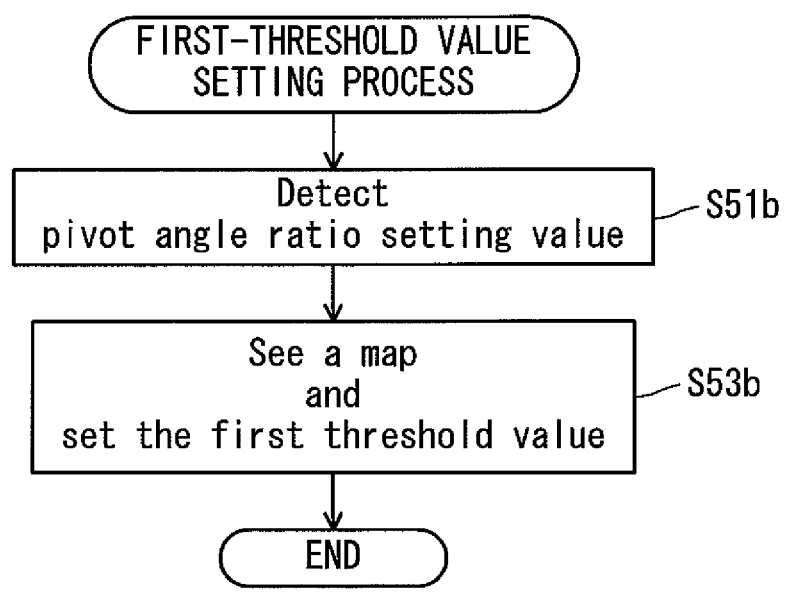
FIG. 13 is a flowchart showing still another example of the first-threshold value setting process.

The first-threshold value setting process in FIG. 13 is used in cases where the pivot angle ratio is varied in accordance with the boat speed. As shown in FIG. 11 for example, the pivot angle ratio is set to 1/24(=30/720) as indicated by a solid line R1 when the boat speed is not slower than 40 km/h, for example; to 1/12(=30/360) as indicated by an alternate long and short dash line R2 when the boat speed is not faster than 10 km/h, for example; and the ratio is gradually changed when the boat speed is between these two settings. Such a setting on the pivot angle ratio of the steering section 12 is performed by the ECU 16, and the values for these settings are stored in the memory in the ECU 16.

Figure 14:
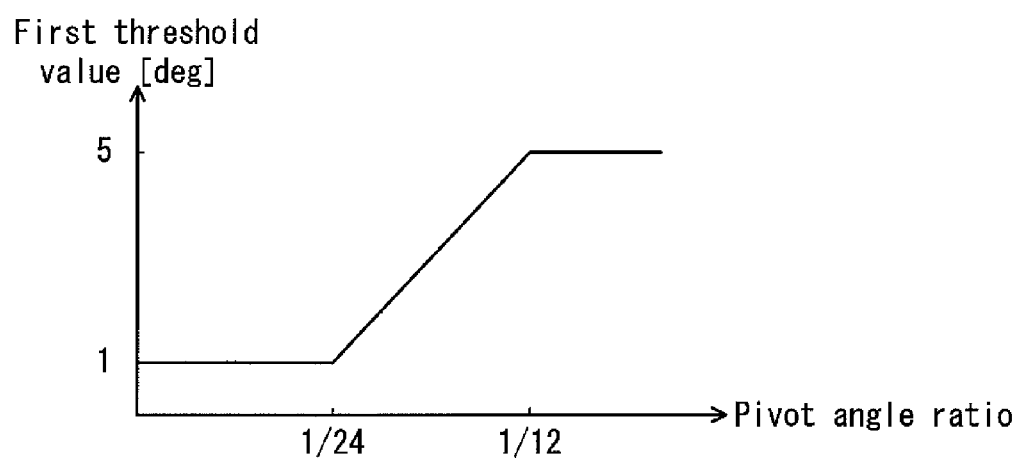
FIG. 14 is a graph showing a relationship between pivot angle ratio and the first threshold value.

In the first-threshold value setting process in FIG. 13, the ECU 16 first detects pivot angle ratio setting value (Step S51b). Then, the ECU 16 makes reference to a map which contains information as shown in FIG. 14, and sets the first threshold value based on the detected pivot angle ratio (Step S53b). As described earlier, based on the design principle that a slower boat speed will lead to a setting of a larger pivot angle ratio, it is assumed that a larger pivot angle ratio means a slower boat speed, and further, that a larger pivot angle ratio means a larger angle difference between the target pivot angle and the actual pivot angle. Correspondingly to these, the map used in Step S53b gives a larger first threshold value when the pivot angle ratio is larger (see FIG. 14).

Setting the first threshold value based on the pivot angle ratio as described above also ensures appropriate determination of an abnormality regarding the steering of the outboard engine main body 28 in accordance with the state of travel of the hull 2.

It should be noted here that the pivot angle ratio may be varied in accordance with the steering angle as indicated by a curvy broken line R3 in FIG. 11. In this case, the pivot angle ratio setting is made in accordance with the steering angle, and reference is made to FIG. 14 to find the first threshold value which corresponds to the pivot angle ratio.

Next, reference will be made to FIG. 15 to describe still another example of the first-threshold value setting process in Step S21 in FIG. 7.

In the first-threshold value setting process in FIG. 15, setting of the first threshold value is made on the basis of a supply voltage to the electric motor 62.

First, the ECU 16 detects a supply voltage that is supplied to the electric motor 62, via the driver 78 (Step S51c). Then, the ECU 16 makes reference to a map which contains information as shown in FIG. 16, and sets the first threshold value based on the detected supply voltage (Step S53c). Power supply equipment such as secondary batteries which are mounted in the hull 2 varies in performance from a hull 2 to another, and voltage supply to other components than the electric motor 62 may cause decrease in the supply voltage to the electric motor 62. If the supply voltage to the electric motor 62 is small, there can be a case where the electric motor 62 is not driven appropriately and therefore the actual pivot angle cannot be set to the target pivot angle, resulting in an increased angle difference between the target pivot angle and the actual pivot angle. Correspondingly to these, the map used in Step S53c gives a larger first threshold value when the supply voltage is smaller (see FIG. 16).

Setting the first threshold value as described above ensures appropriate determination of an abnormality regarding the steering of outboard engine main body 28 regardless of the performance of power supply equipment mounted in the hull 2.

Next, reference will be made to FIG. 17 to describe still another example of the first-threshold value setting process in Step S21 in FIG. 7.

In the first-threshold value setting process in FIG. 17, setting of the first threshold value is made on the basis of the quantity of the outboard engine main bodies 28 included in the boat propelling system 10.

Figure 18:
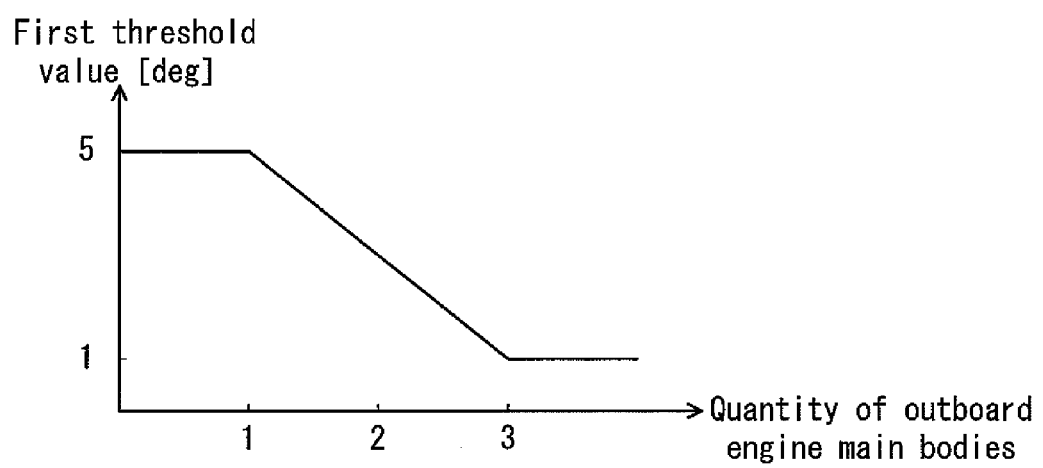
FIG. 18 is a graph showing a relationship between quantities of outboard engine main bodies and the first threshold value.

First, the ECU 16 detects the quantity of outboard engine main bodies 28 included in the boat propelling system 10 (Step S51d). Then, the ECU 16 makes reference to a map which contains information as shown in FIG. 18, and sets the first threshold value based on the detected quantity of the outboard engine main bodes 28 (Step S53d). A large quantity of outboard engine main bodies 28 included in the boat propelling system 10 means large propelling power and greater agility of the boat. In other words, if the quantity of outboard engine main bodies 28 is large, a total propelling force is large and therefore a small steering operation can accomplish a behavior which is close enough to the one desired by the user even if a steering movement in each of the outboard engine main bodies 28 is not large. On the other hand, if the quantity of outboard engine main bodies 28 is small, the propelling force is small, so the boat cannot move agilely and it is therefore necessary to make a large steering operation in each of the outboard engine main bodies 28 when turning the boat's direction, for example. However, a large steering operation results in an increased amount of steering delay, i.e., a large gap amount δθ between the target pivot angle change amount δθt and the actual pivot angle change amount δθp. Correspondingly to this, the map used in Step S53d gives a larger first threshold value when the quantity of outboard engine main bodies 28 is smaller (see FIG. 18).

Setting the first threshold value as described above ensures appropriate determination of an abnormality regarding the steering of the outboard engine main body 28 regardless of the quantity of the outboard engine main bodies 28.

Figure 8:
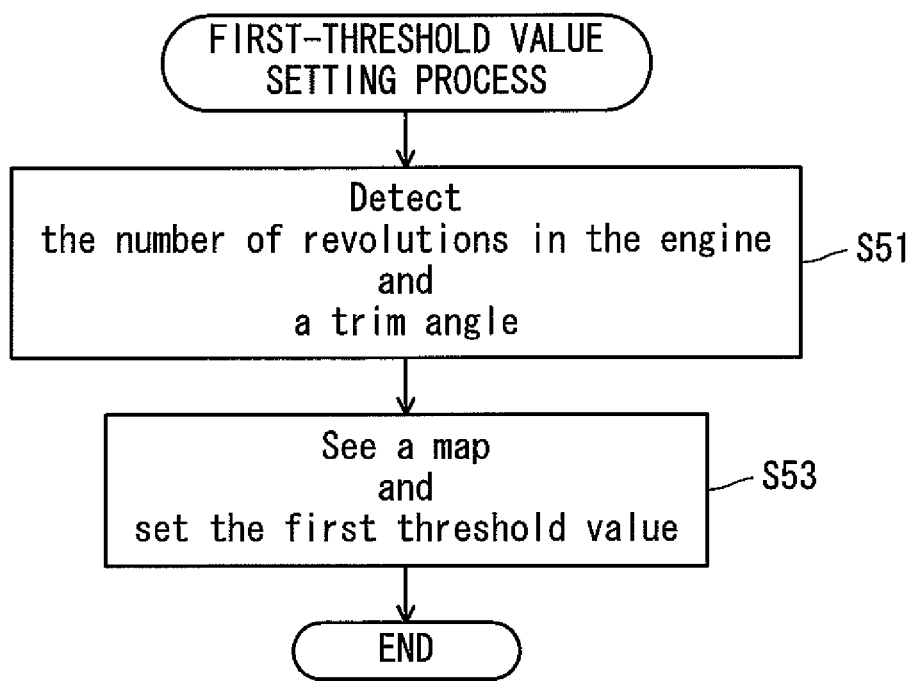
FIG. 8 is a flowchart showing an example of a first-threshold value setting process.
Figure 19:
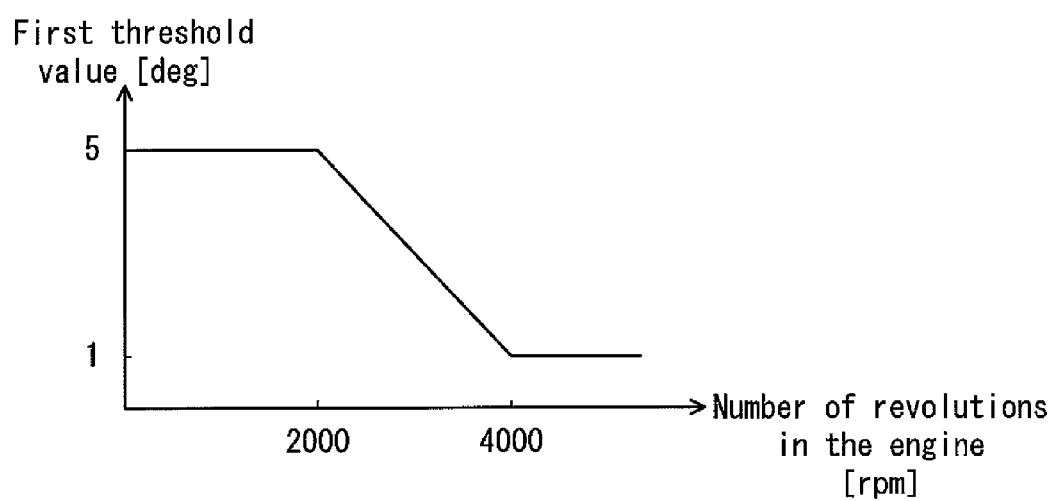
FIG. 19 is a graph showing a relationship between the number of revolutions in an engine and the first threshold value.
Figure 20:
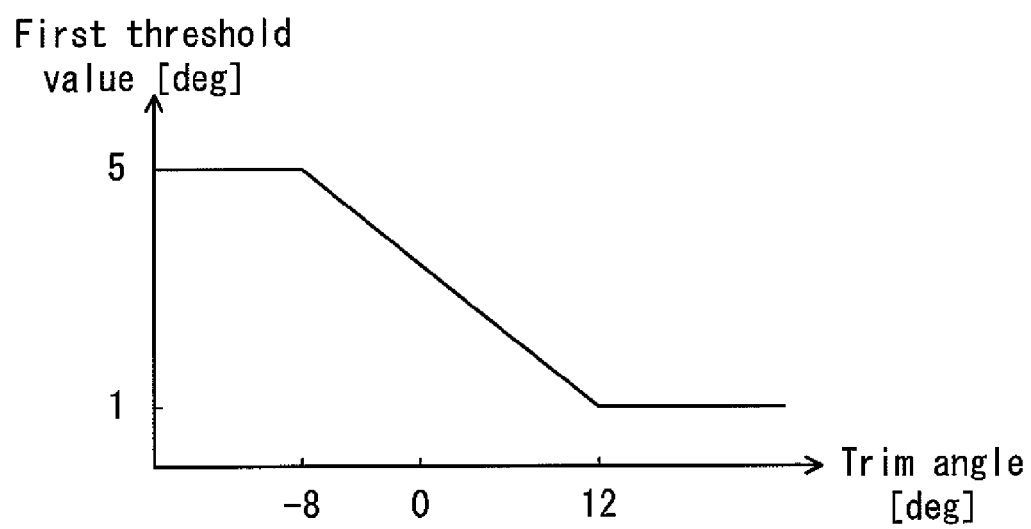
FIG. 20 is a graph showing a relationship between trim angle and the first threshold value.

It should be noted here that in the first-threshold value setting process shown in FIG. 8, description was made for a case of setting the first threshold value based on the number of revolutions in the engine 40 and the trim angle of the outboard engine main body 28. However, setting of the first threshold value may be made based on either one of the number of revolutions and the trim angle. In cases where the first threshold value is set only on the basis of the number of revolutions in the engine 40, the map which contains information as shown in FIG. 19 may be used. Based on this assumption, as described earlier, that a smaller number of revolutions in the engine 40 means a slower boat speed and a larger angle difference between the target pivot angle and the actual pivot angle, FIG. 19 gives a larger first threshold value when the number of revolutions is smaller. On the other hand, in cases where the trim angle is the only basis for setting the first threshold value, a map which contains information as shown in FIG. 20 may be used. Based on the assumption, as described earlier, that a smaller trim angle means a slower boat speed and a larger angle difference between the target pivot angle and the actual pivot angle, FIG. 20 gives a larger first threshold value when the trim angle is smaller.

Setting the first threshold value based on either one of the number of revolutions in the engine 40 and the trim angle as described above also allows appropriate determination of an abnormality regarding the steering of the outboard engine main body 28 in accordance with the state of travel of the hull 2.

It should be noted here that the operation information regarding operation on the steering section 12 is not limited to steering angle but may be provided by operation speed. The speed information regarding a speed of the hull 2 is not limited to the number of revolutions in the engine 40 but may be provided by a boat speed detected by the speed sensor 22a. The electric power information regarding electric power supplied to the electric motor 62 is not limited to a supply voltage but may be provided by a battery voltage or a generator amperage.

The actuator for pivoting the propelling system main body (outboard engine main body 28) is not limited to the electric motor 62 but may be provided by a cylinder, or the like.

In the above preferred embodiments, description was made for a case where two of the outboard engines 24, for example, are preferably installed in the boat 1. However, the present invention is not limited by this. The present invention is applicable to cases where only one outboard engine is installed in a boat, or cases where three or more outboard engines are installed.

The present invention being thus far described in terms of preferred embodiments, it should be noted that the preferred embodiments may be varied in many ways within the scope and the spirit of the present invention. The scope of the present invention is only limited by the accompanied claims.

What is claimed is:

1. A boat propelling system for propelling a hull, the boat propelling system comprising:
   a propelling system main body;
   a bracket section arranged to allow the propelling system main body to pivot in a right-left direction with respect to the hull;
   an actuator arranged to pivot the propelling system main body in the right-left direction;
   a steering section arranged to steer the propelling system main body;
   an operation information detection section arranged to detect operation information regarding an amount of operation provided to the steering section;
   an actual pivot angle detection section arranged to detect an actual pivot angle of the propelling system main body;
   a first calculating section arranged to calculate a target pivot angle change amount based on a target pivot angle of the propelling system main body derived from the operation information and based on a baseline target pivot angle, the baseline target pivot angle being updatable;
   a second calculating section arranged to calculate an actual pivot angle change amount based on the actual pivot angle and a baseline actual pivot angle, the baseline actual pivot angle being updatable;
   a gap amount obtaining section arranged to obtain a gap amount between the target pivot angle change amount and the actual pivot angle change amount;
   a determination section arranged to determine an abnormality regarding steering of the propelling system main body if the gap amount is greater than or equal to a first threshold value, and to determine no abnormality regarding the steering of the propelling system main body if the gap amount is less than the first threshold value; and an engine control unit arranged and programmed to prevent the actuator from pivoting the propelling system main body when the determination section determines the abnormality regarding the steering of the propelling system main body.

2. The boat propelling system according to claim 1, further comprising a baseline pivot angle setting section arranged to update the baseline target pivot angle and the baseline actual pivot angle if the gap amount is smaller than a second threshold value.

3. The boat propelling system according to claim 1, wherein the bracket section is arranged to allow the propelling system main body to pivot in an up-down direction with respect to the hull, and the boat propelling system further comprises:
   a speed information detection section arranged to detect speed information regarding a speed of the hull;
   a trim angle detection section arranged to detect a trim angle of the propelling system main body; and
   a threshold value setting section arranged to set the first threshold value based on at least one of the speed information and the trim angle.

4. The boat propelling system according to claim 1, further comprising an operation range setting section arranged to set an operation range of the steering section; and
   a threshold value setting section arranged to set the first threshold value based on the operation range.

5. The boat propelling system according to claim 1, further comprising a pivot angle ratio setting section arranged to set a pivot angle ratio; and
   a threshold value setting section arranged to set the first threshold value based on the pivot angle ratio.

6. The boat propelling system according to claim 1, wherein the actuator includes an electric motor, and the boat propelling system further comprises:
   an electric power information detection section arranged to detect electric power information regarding electric power supplied to the electric motor; and
   a threshold value setting section arranged to set the first threshold value based on the electric power information.

7. The boat propelling system according to claim 1, further comprising a threshold value setting section arranged to set the first threshold value based on a quantity of the propelling system main bodies included in the boat propelling system.

* * * * *